Patented Mar. 28, 1939

2,152,371

UNITED STATES PATENT OFFICE 2,152,371

PREPARATION OF PENTAERYTHRITOL

Joseph A. Wyler, Allentown, Pa., assignor to Trojan Powder Company, Allentown, Pa.

No Drawing. Application October 8, 1937, Serial No. 168,066

8 Claims. (Cl. 260—635)

My invention relates to the preparation of pentaerythritol and more specifically relates to a process for the preparation of pentaerythritol from formaldehyde and acetaldehyde through the agency of certain catalysts.

It is well known that pentaerythritol is formed by the condensation of four molecules of formaldehyde and one molecule of acetaldehyde in the presence of such alkalies as NaOH, KOH, $Ca(OH)_2$ and $Ba(OH)_2$, and many processes for carrying out this condensation are available to the public.

In the commercial processes now in use for the preparation of pentaerythritol the yields of pentaerythritol obtained are usually about 50–60% of theory. If the condensation is conducted in accordance with my invention yields of 80–90% of theory are obtained.

I have discovered that alkyl ammonium hydroxides when used in combination with alkalies as $Ca(OH)_2$, NaOH, KOH, etc. exert a pronounced catalytic effect upon the reaction between formaldehyde and acetaldehyde. This catalytic effect is not importantly related to the speed of the reaction, but it is particularly related to the direction taken by the reaction. In other words, the use of lime alone, as condensation agent induces a condensation reaction velocity of about the same order of magnitude as do mixtures of lime and tetraalkylammonium hydroxides, but the course of the condensation in the case where the lime alone is used is not the same as in the cases where the mixtures of lime and tetraalkylammonium hydroxides are used.

The theoretical reaction for the condensation of formaldehyde and acetaldehyde is as follows:

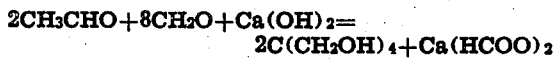

however, in all known processes, this reaction is accompanied by several side reactions which produce sugars and which account for part of the loss in yield of pentaerythritol. Consequently, an important function performed by my catalysts is to direct the actual course of the reaction so as to form —$CH_2OH$ groups (which are the characteristic groups of pentaerythritol) and thus to prevent the formation of —CHOH groups (which are the characteristic groups of sugars).

In carrying out my process I may use any suitable proportions of the reagents,—water, formaldehyde, acetaldehyde and alkali, or I may use any suitable temperature.

In general, the commercial condensation is based upon the use of four to five molecules of formaldehyde for each molecule of acetaldehyde, in alkaline medium, at temperatures not exceeding 50° C., and in such a volume of water as to provide a solution to contain less than 20% of aldehydes at the beginning of the reaction.

My invention is characterized by the use of tetraalkylammonium hydroxides in association with fixed alkalies, as a substitute for the fixed alkalies alone, thereby causing a distinct improvement in the yield of pentaerythritol.

In order to more clearly point out my invention and to show how my invention cooperates with processes old in this art, the following example is given.

Example 396 parts of 30.34% formaldehyde (by weight) and 83 parts of 52.8% commercial acetaldehyde (by weight) are mixed with 900 parts (by weight) of water in a suitable container provided with a stirrer. Also, 35 parts of commercial lime (CaO) are treated with 166 parts of water so as to form a slurry.

To the aldehyde solution prepared as above, add say, four parts of tetraethylammonium hydroxide and then add the lime slurry, slowly, over a period of about 4½ hours, maintaining the temperature of the reaction mixture at about 20° C. At the expiration of this period the reaction will have proceeded to the extent of about 90% of completion. The mixture is kept at room temperature and stirred until tests indicate the substantial absence of formaldehyde and of acetaldehyde. A typical end point for the reaction is one indicating 0.09% aldehydes present, as determined with iodine solution. The total time required for this reaction to complete itself is from two to seventy hours, depending upon the temperature of the solution, the particular fixed alkali used, the rate of stirring, the concentration of aldehydes, etc.

In this particular example the temperature was kept at 20–23° C. for a total of 73 hours, with stirring for only 14 hours.

The reaction mixture, at completion, is usually of a light lemon yellow color. It is then treated with slightly less sulphuric acid than is theoretically equivalent to the lime used. This precipitates the lime as calcium sulfate. In order to precipitate all of the lime out the solution, a small amount of oxalic acid is added in the form of a water solution and the mixture stirred for an hour or more. The mixture is then filtered. The filtrate is evaporated and the pentaerythritol recovered by crystallization. This pentaerythritol is almost pure white. The weight of dry crystals readily obtained is 109 parts or 80% of theory. By further treatment of the mother liquor it is possible to obtain 13 more parts of pentaerythritol making the total yield equal to 90% of theory. The remaining material is a syrup.

In the above embodiment of my invention, I have given certain specific details. I wish to emphasize that I have not mentioned these details for the purpose of limiting my invention but that they are given to show the preferred mode in which I contemplate applying my invention.

In place of the lime, I may use any water soluble, metal hydroxide as Ba(OH)$_2$, Sr(OH)$_2$, NaOH, KOH, etc., and in place of the tetraethylammonium hydroxide [(C$_2$H$_5$)$_4$N.OH] I may use tetramethylammonium hydroxide [(CH$_3$)$_4$N.OH], tetrapropylammonium hydroxide (C$_3$H$_7$)$_4$N.OH, methyltriethylammonium hydroxide

[CH$_3$(C$_2$H$_5$)$_3$N.OH]

and other similarly constituted alkyl ammonium hydroxides as come under the well known classification of "quaternary bases". These bases have the common characteristics of being strongly basic, of being very highly dissociated in water and of forming definite salts with acids.

As mentioned above, my invention is not limited to the details given in the above example. I may vary the temperature at which the reaction is carried out, the proportion of CH$_2$O to CH$_3$CHO, the concentration of these aldehydes, the rate of addition of the fixed alkali, the order of addition of the reagents, the amount of alkali used, the amount of quaternary base used and such other operative details as would occur to a workman skilled in this art. My invention is therefore limited only by the appended claims.

I claim:

1. The condensation of formaldehyde and acetaldehyde to pentaerythritol in the presence of a mixture of a member of the group consisting of the alkali metal and alkaline earth metal hydroxides and a tetraalkylammonium hydroxide.

2. The condensation of formaldehyde and acetaldehyde to pentaerythritol in the presence of a mixture of a member of the group consisting of the alkali metal and alkaline earth metal hydroxides and tetraethylammonium hydroxide.

3. The condensation of formaldehyde and acetaldehyde to pentaerythritol in the presence of a mixture of a member of the group consisting of the alkali metal and alkaline earth metal hydroxides and methyltriethyl ammonium hydroxide.

4. The condensation of formaldehyde and acetaldehyde to pentaerythritol in the presence of a mixture of a member of the group consisting of the alkali metal and alkaline earth metal hydroxides and tetramethylammonium hydroxide.

5. The process of condensing formaldehyde and acetaldehyde to pentaerythritol which comprises the addition of a member of the group consisting of the alkali metal and alkaline earth metal hydroxides to an aqueous mixture containing a tetraalkylammonium hydroxide, formaldehyde and acetaldehyde, the ratio of formaldehyde to acetaldehyde being approximately four to one.

6. The process of condensing formaldehyde and acetaldehyde to pentaerythritol which comprises the addition of a member of the group consisting of the alkali metal and alkaline earth metal hydroxides to an aqueous mixture containing a tetraalkylammonium hydroxide, formaldehyde and acetaldehyde, the ratio of formaldehyde to acetaldehyde being approximately four to one, and the ratio of the metal hydroxide to the tetraalkylammonium hydroxide being greater than one to one.

7. The condensation of formaldehyde and acetaldehyde to pentaerythritol in the presence of a mixture of a member of the group consisting of the alkali metal and alkaline earth metal hydroxides and tetraalkylammonium hydroxide, said metal hydroxide being present in an amount greater than that of the tetraalkylammonium hydroxide.

8. The process of condensing formaldehyde and acetaldehyde to pentaerythritol which comprises the addition of a member of the group consisting of the alkali metal and alkaline earth metal hydroxides to an aqueous mixture containing a tetraalkylammonium hydroxide, formaldehyde and acetaldehyde, the ratio of formaldehyde to acetaldehyde being approximately four to one, the total aldehyde content of the solution being less than 20% by weight, and the ratio of the metal hydroxide to the tetraalkylammonium hydroxide being greater than one to one.

JOSEPH A. WYLER.